(12) United States Patent
Yang et al.

(10) Patent No.: US 10,122,548 B2
(45) Date of Patent: Nov. 6, 2018

(54) SERVICES EXECUTION

(71) Applicant: HANGZHOU H3C TECHNOLOGIES CO., LTD., Zhejiang (CN)

(72) Inventors: Xiaopeng Yang, Beijing (CN); Min Zheng, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 23 days.

(21) Appl. No.: 15/520,151

(22) PCT Filed: Oct. 27, 2015

(86) PCT No.: PCT/CN2015/092903
§ 371 (c)(1),
(2) Date: Apr. 19, 2017

(87) PCT Pub. No.: WO2016/066077
PCT Pub. Date: May 6, 2016

(65) Prior Publication Data
US 2017/0324582 A1     Nov. 9, 2017

(30) Foreign Application Priority Data

Oct. 27, 2014   (CN) .......................... 2014 1 0581462

(51) Int. Cl.
*H04L 29/08*     (2006.01)
*H04L 12/46*     (2006.01)
*H04L 12/931*    (2013.01)

(52) U.S. Cl.
CPC ...... *H04L 12/4679* (2013.01); *H04L 12/4633* (2013.01); *H04L 29/08* (2013.01); *H04L 49/354* (2013.01)

(58) Field of Classification Search
CPC . H04L 12/4679; H04L 29/08; H04L 12/4633; H04L 49/354
See application file for complete search history.

(56) References Cited

U.S. PATENT DOCUMENTS

| 7,484,208 | B1  | 1/2009 | Nelson |
| 2013/0163594 | A1* | 6/2013 | Sharma ................... H04L 45/64 370/392 |

(Continued)

FOREIGN PATENT DOCUMENTS

| CN | 103516620 | 1/2014 |
| CN | 103997414 | 8/2014 |
| CN | 104010028 | 8/2014 |

OTHER PUBLICATIONS

International Searching Authority, "Notfication of Transmittal of the International Search Report and the Written Opinion", dated Feb. 2, 2016, PCT/CN2015/092903 7 pages.

*Primary Examiner* — Lakeram Jangbahadur
(74) *Attorney, Agent, or Firm* — Hewlett Packard Enterprise Patent Department

(57) ABSTRACT

An edge switch receives a VM classification policy and an executing policy corresponding to each VM class distributed by a policy controller. The executing policy comprises information of each service node for processing a message and an executing sequence of the each service node. The edge switch receives a message sent by a VM connected to the edge switch, determines a VM class corresponding to the message according to the VM classification policy and determines an executing policy corresponding to the VM class. The edge switch encapsulates the message according to information of each service node to be executed by a VM of the VM class and an executing sequence, and sends the (Continued)

message, so that the message is sequentially sent to the each service node to be executed by the VM of the VM class to execute a service policy.

6 Claims, 8 Drawing Sheets

(56) References Cited

U.S. PATENT DOCUMENTS

2014/0016501 A1* 1/2014 Kamath ................... H04L 69/22
370/253
2015/0355934 A1* 12/2015 Yin .......................... H04L 49/70
718/1

* cited by examiner

| names of service nodes, IP addresses and an executing sequence; names of executed service nodes: null | inner layer destination MAC address | inner layer source MAC address | type, length | inner layer Ethernet encapsulated original message | FCS (check code) |

| destination MAC address (the MAC address of IPGW1) | source MAC address (which may be constructed arbitrarily) | type, length | destination IP address (the IP address of service node A) | source IP address (the IP address of VTEP 1 or VM1) | names of service nodes, IP addresses and an executing sequence; names of executed service nodes: null | inner layer destination MAC address | inner layer source MAC address | type, length | inner layer Ethernet encapsulated original message | FCS |
|---|---|---|---|---|---|---|---|---|---|---|

Figure 5

| destination MAC address (the MAC address of VTEP 2) | source MAC address (the MAC address of VTEP 1) | type, length | destination IP address (the IP address of VTEP 2) | source IP address (the IP address of VTEP 1) | destination MAC address (the MAC address of IPGW1) | source MAC address (which may be constructed arbitrarily) | type, length | destination IP address (the IP address of service node A) | source IP address (the IP address of VTEP 1 or VM1) | names of service nodes, IP addresses and an executing sequence; names of executed service nodes: null | inner layer destination MAC address | inner layer source MAC address | type, length | inner layer Ethernet encapsulated original message | F C S |

Figure 6

| destination MAC address (the MAC address of IPGW2) | source MAC address (which may be constructed arbitrarily) | type, length | destination IP address (the IP address of service node B) | source IP address (the IP address of VTEP 1 or VM1) | names of service nodes. IP addresses and an executing sequence; names of executed service nodes: service node A | inner layer destination MAC address | inner layer source MAC address | type, length | inner layer Ethernet encapsulated original message | FCS |
|---|---|---|---|---|---|---|---|---|---|---|

Figure 7

| desti-nation MAC address (the MAC address of VTEP 3) | source MAC address (the MAC address of VTEP 2) | type, length | desti-nation IP address (the IP address of VTEP 3) | source IP address (the IP address of VTEP 2) | desti-nation MAC address (the MAC address of PGW2) | source MAC address (which may be constructed arbitrarily) | type, length | desti-nation IP address (the IP address of service node B) | source IP address (the IP address of VTEP 1 or VM1) | names of service nodes, IP addresses and an executing sequence; names of executed service nodes: service node A | inner layer desti-nation MAC address | inner layer source MAC address | type, length | inner layer Ethernet encapsulated original message | F C S |

SERVICES EXECUTION

BACKGROUND

Along with the developments of computer and network technologies, network clouding technologies is a future development trend. Currently, when establishing cloud computing environment, physical zones may be divided according to department locations, physical locations and etc., and cloud computing environment is established for each physical zone respectively. Service resources are deployed for the cloud computing environment according to characterizations of each physical zone, such as firewall deployment, Intrusion Prevention System (IPS) deployment, load balancing and etc. Service resources are mostly exclusive for each physical zone and there is very little client migration. When large-scale client migration is needed, the service resources are re-deployed to adapt to the migration. In addition, the sequence for executing multiple services is relatively fixed.

BRIEF DESCRIPTION OF THE DRAWINGS

FIG. 5 is a schematic diagram illustrating a format of a message having an outer service information layer, an outer layer IP header, and an outer layer MAC header according to various examples of the present disclosure.

FIG. 6 is a schematic diagram illustrating a format of a message having an outer service information layer, an outer layer IP header, an outer layer MAC header, and a VXLAN header according to various examples of the present disclosure.

FIG. 7 is a schematic diagram illustrating a format of a message after a first service node A performs encapsulation for the message according to an example of the present disclosure.

FIG. 8 is a schematic diagram illustrating a format of a message after an edge switch 2 performs encapsulation for the message according to an example of the present disclosure.

DETAILED DESCRIPTION

The present disclosure will be illustrated in detail hereinafter with reference to the accompanying drawings and specific examples.

As used in the description herein and throughout the claims that follow, the meaning of "a", "an", and "the" includes both the singular and plural unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Figure 1:
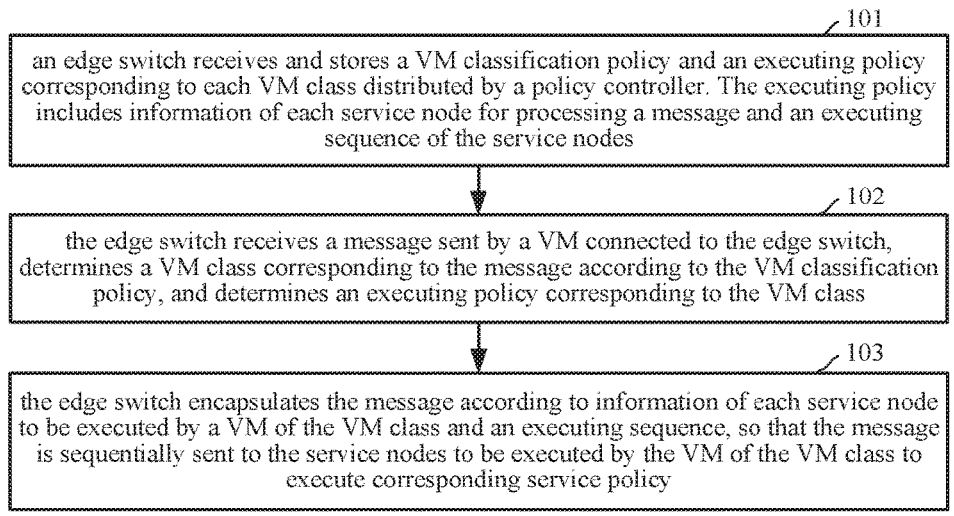
FIG. 1 is a schematic flowchart illustrating a method for executing a service according to an example of the present disclosure.

FIG. 1 is a schematic flowchart illustrating a method for executing a service according to an example of the present disclosure.

At block 101, an edge switch receives and stores a virtual machine (VM) classification policy and an executing policy corresponding to each VM class distributed by a policy controller. The executing policy may include information of each service node for processing a message and an executing sequence of the service nodes.

The service node may include a firewall, an IPS, a load balancing and etc. The information of the service node may include a name of the service node, an address of the service node and etc. The address of the service node is an address of a service node device.

In an example, a network administrator configures the VM classification policy and the executing policy corresponding to each VM class on the policy controller in advance. The policy controller distributes the VM classification policy and the executing policy corresponding to each VM class to all edge switches, and each edge switch stores the VM classification policy and the executing policy corresponding to each VM class.

The VM classification policy may include classifying the VMs according to quintuple information. For instance, the VMs may be classified according to IP address sections, or MAC addresses, or a combination of the IP address sections and the MAC addresses.

In an example, the executing policy corresponding to each VM class may include (1) information of each service node to be executed by a VM of the VM class, such as a name, an address and etc.; (2) a sequence for executing the service nodes.

In an example, the information of each service node to be executed by the VM of the VM class includes:

(1) a service node 1: firewall; a service node 2: load balancing; an IP address of the service node 1, and an IP address of the service node 2.

(2) the sequence for executing the service nodes is that the service node 1 is executed first and then the service node 2 is executed.

The network administrator or a managing device configures the service policy on the service node, such as, configures an Access Control List (ACL) policy, an anti-attack policy and etc.

In an example, after receiving a updated VM classification policy distributed by the policy controller, the edge switch updates a VM classification policy stored by the edge switch. In another example, after receiving a updated executing policy corresponding to one VM class distributed by the policy controller, the edge switch updates a stored executing policy corresponding to the VM class.

At block 102, the edge switch receives a message sent by a VM connected to the edge switch, determines a VM class corresponding to the message according to the VM classification policy, and determines an executing policy according to the determined VM class.

At block 103, the edge switch encapsulates the message according to information of each service node to be executed by a VM of the VM class and an executing sequence, so that the message is sequentially sent to the service nodes to be executed by the VM of the VM class to execute corresponding service policy.

After the edge switch encapsulates the message, each of the subsequent service nodes may obtain the information of the service nodes and the executing sequence of the service nodes.

In an example, when the message is encapsulated, information of each service node and information of the executing sequence may be encapsulated in an outer service information layer.

The edge switch may generate a service node information table according to the executing policy after receiving the executing policy corresponding to each VM class distributed by the policy controller. An example of the service node information table is shown in table 1.

TABLE 1 an example of the service node information table generated by the edge switch

| Quintuple information of the VMs | Quintuple classification | service nodes to be executed and an executing sequence | information of service nodes |
|---|---|---|---|
| IP: 10.10.10.1 MAC: xxx ... | Market | policy X of A (e.g. firewall) policy Y of B (e.g. load balancing) policy Z of C (e.g. IPS) | IP address of A, MAC address of A, ... ; IP address of B, MAC address of B, ... ; IP address of C, MAC address of C, ... ; |

After receiving the message from the VM connected to edge switch, the edge switch encapsulates the information of the service nodes and the executing sequence which are recorded in the service node information table into the outer service information layer. Hence, when the service node parses the message, the service node may send the message to another service node according to the information of the service nodes and the executing sequence which are recorded in the outer service information layer.

According to an example, at block 103, when the edge switch encapsulates the message according to the information of each service node to be executed by the VM of the VM class and the executing sequence, the edge switch encapsulates the information of each service node to be executed by the VM of the VM class and information of each executed service node in the outer service information layer of the message according to the executing sequence, encapsulates an address of a first service node to be executed in an outer layer address header of the message as a destination address.

When the outer service information layer of the message is encapsulated, preconfigured locations are used to indicate the information of the executed service nodes. When the edge switch encapsulates the message, the preconfigured locations are null. After the service node executes the service policy for the message, the service node encapsulates information of the service node, e.g. at least one of an ID, an IP address and an MAC address, into the preconfigured location, so that the message is sent to a next service node according to the executing sequence and the next service node processes the message.

In an example, the information of the service nodes to be executed may be encapsulated, or other modes may be used to notify the service nodes of the executed service nodes and the service nodes to be executed, which are not limited in the present disclosure.

In an example, a virtual Extensible LAN (VXLAN) Tunnel End Point (VTEP) function and an Internet Protocol GateWay (IPGW) function are enabled on the edge switch, and a VTEP IP address, an IPGW IP address and an MAC address are configured for the edge switch.

At block 103, when the edge switch forwards the message, the following processing is performed.

If the edge switch does not find an IP address of the first service node to be executed by the VM of the VM class in a local layer-2 MAC forwarding table, an outer layer IP header and an outer layer MAC header are encapsulated into the message. In the outer layer IP header, a source IP address is the VTEP IP address of the edge switch or an IP address of the VM, and a destination IP address is the IP address of the first service node to be executed by the VM of the VM class. In the outer layer MAC header, a source MAC address is an arbitrarily MAC address, and a destination MAC address is the MAC address of the edge switch.

The edge switch starts to perform forwarding processing for the message, discovers that the outer layer destination MAC address is a gateway MAC address, and determines to perform layer-3 forwarding processing. In the layer-3 forwarding processing, the edge switch searches for a VTEP according to the outer layer destination IP address of the message, and performs VXLAN encapsulation for the message according to the found VTEP. In a VXLAN header, a source IP address and a source MAC address are the VTEP IP address and the MAC address of the edge switch respectively, and a destination IP address and a destination MAC address are a found VTEP IP address and a found MAC address respectively. The edge switch sends out the processed message.

Figure 2:
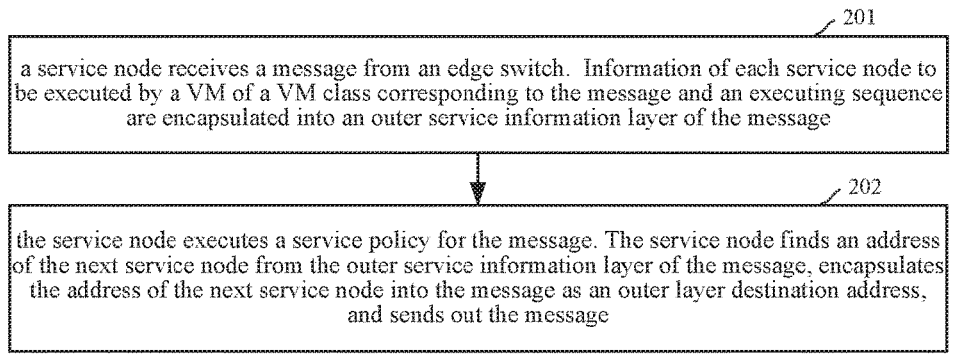
FIG. 2 is a schematic flowchart illustrating a method for executing a service according to another example of the present disclosure.

FIG. 2 is a schematic flowchart illustrating a method for executing a service according to another example of the present disclosure. The method includes the following processing.

At block 201, a service node receives a message from an edge switch. Information of each service node to be executed by a VM of a VM class corresponding to the message and an executing sequence of each service node are encapsulated into an outer service information layer of the message.

At block 202, the service node executes a service policy for the message. After the service policy is executed, if it is determined that the service node is not a last service node, the service node finds an address of the next service node from the outer service information layer of the message, encapsulates the address of the next service node into the message as an outer layer destination address, and sends out the message.

At block 202, after the service node executes the service policy for the message, if it is determined that the service node is the last service node, the service node removes the outer service information layer of the message, and sends the message to the edge switch of the service node, so that the edge switch sends the message to a destination VM.

Example embodiments will now be described more fully with reference to the accompanying drawings.

Figures 3, 4:
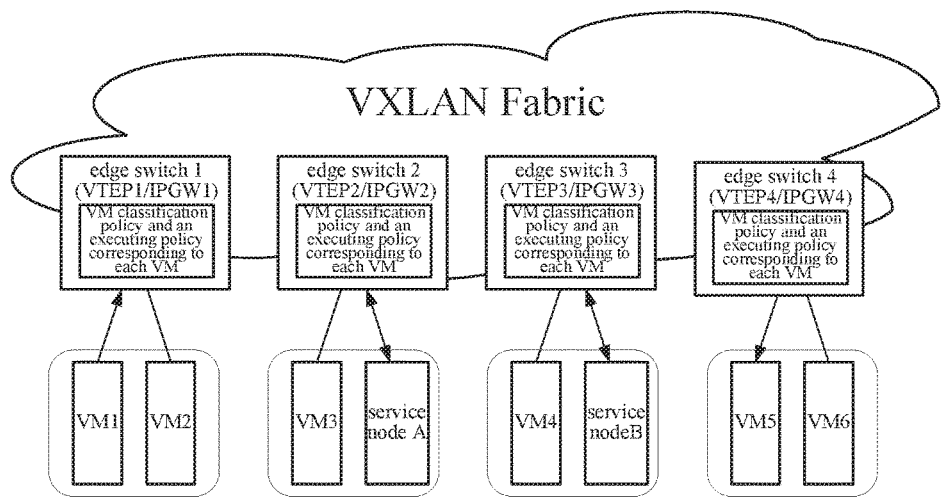
FIG. 3 is a schematic diagram illustrating a networking of an application example according to various examples of the present disclosure.
FIG. 4 is a schematic diagram illustrating a format of a message having an outer service information layer according to various examples of the present disclosure.

FIG. 3 is a schematic diagram illustrating a networking of an example according to various examples of the present disclosure. In this example, all of edge switches 1 to 4 have enabled the VTEP and IPGW functions and access to a VXLAN Fabric network, and thus the edge switches 1 to 4 may be called VTEP1/IPGW1, VTEP2/IPGW2, VTEP3/IPGW3 and VTEP4/IPGW4. Each of the edge switches 1 to 4 is configured with an IP address and a MAC address. The IP address is an IP address of the VTEP and IPGW. The MAC address is a MAC address of the VTEP and IPGW. Each of the edge switches 1 to 4 stores a VM classification policy and an executing policy corresponding to each VM class distributed by a policy controller. In an example, the VM classification policy may include classifying the VMs according to quintuple information.

In an example, VM1 needs to send a message to VM5, and the following processing is performed.

At block 301, VM1 sends a message to a Fabric network. A destination IP address of the message is an IP address of the VM5, and a destination MAC address is a gateway MAC address configured for VM1, i.e. a MAC address of the edge switch 1.

Each VM is configured with a gateway MAC address. As shown in FIG. 3, the gateway MAC address configured for VM1 and VM2 is a MAC address of the edge switch 1, the gateway MAC address configured for VM3 and a service node A is a MAC address of the edge switch 2, the gateway MAC address configured for VM4 and a service node B is a MAC address of the edge switch 3, the gateway MAC address configured for VM5 and VM6 is a MAC address of the edge switch 4.

At block 302, after receiving the message, the edge switch 1 searches the VM classification policy stored locally for a VM class corresponding to a quintuple of the message, and searches the executing policy corresponding to each VM class stored locally for both information of each service node to be executed by a VM of the VM class and an executing sequence according to the found VM class.

It is assumed that the service nodes to be executed by the VM of the VM class and the executing sequence found by the edge switch 1 are as follows.

1) names of the service nodes: a service node A is a firewall, a service node B is load balancing; an IP address and a MAC address of the service node A, an IP address and a MAC address of the service node B;

2) the executing sequence of the service nodes is that the service node A is executed first and then the service node B is executed.

At block 303, the edge switch 1 encapsulates a service information layer into an outer layer of the message. The service information layer is called an outer service information layer in the following descriptions. Contents of the outer service information layer include information of each service node to be executed by the VM of the VM class, such as names and IP addresses, the executing sequence, and names of executed service nodes, an initial value of which is null. The format of the message encapsulated with the outer service information layer is shown in FIG. 4.

At block 304, the edge switch 1 does not find an entry corresponding to an IP address of the service node A in a local layer-2 MAC forwarding table, and then encapsulates an outer layer IP header and an outer layer MAC header into the message. In the outer layer IP header, a source IP address is the IP address of the edge switch 1 or an IP address of the VM1, and a destination IP address is the IP address of the service node A. In the outer layer MAC header, a source MAC address is an arbitrarily MAC address, and a destination MAC address is the MAC address of the edge switch 1. The format of the message encapsulated with the outer service information layer, the outer layer IP header and the outer layer MAC header is shown in FIG. 5.

If the edge switch 1 find the entry corresponding to the IP address of the service node A in the local layer-2 MAC forwarding table, it is indicates that service node A is a local host, the edge switch 1 directly forwards the message to the service node A according to an egress port in the entry.

At block 305, the edge switch 1 starts to perform forwarding processing for the message. The edge switch 1 discovers that the outer layer destination MAC address is a gateway MAC address, and determines to perform layer-3 forwarding process. The edge switch 1 searches for a VTEP according to the outer layer destination IP address of the message (the IP address of service node A), finds an IP address and a MAC address of a VTEP2 and performs VXLAN encapsulation for the message. In the VXLAN header, a source IP address and a source MAC address are the IP address and the MAC address of the VTEP1 respectively, and a destination IP address and a destination MAC address are the IP address and the MAC address of the VTEP2 respectively. The format of the message encapsulated with the outer service information layer, the outer layer IP header, the outer layer MAC header and the VXLAN header is shown in FIG. 6. The edge switch 1 sends out the processed message.

For each VTEP in the network, the edge switches 1 to 4 store information of IP addresses of all VMs corresponding to the IP address of the VTEP.

At block 306, the message is received by VTEP2. The edge switch 2 removes the VXLAN header of the message, searches a local layer-2 MAC forwarding table according to the outer layer destination IP address, (i.e. the IP address of service node A, and finds an egress port. The edge switch 2 forwards the message to service node A via the egress port.

At block 307, service node A receives the message and executes the service policy for the message. After the service policy is executed, the name of the service node A is added to the names of the executed service nodes in the outer service information layer of the message. Service node A searches the outer service information layer of the message for the IP address of the next service node B, encapsulates the IP address of the service node B into the message as an outer layer destination IP address, encapsulates the gateway MAC address of the service node A (i.e. the MAC address of the IPGW2), into the message as an outer layer destination MAC address, and then sends the message to the Fabric network.

After service node A performs encapsulation for the message, the format of the message is shown in FIG. 7, the outer layer source IP and MAC address may be not changed.

At block 308, the message is received by the edge switch 2. The edge switch 2 does not find an entry corresponding to the outer layer destination IP address of the message in a local layer-2 MAC forwarding table, and determines to perform layer-3 forwarding processing. The edge switch 2 searches for a VTEP IP address according to the outer layer destination IP address of the message (i.e. the IP address of service node B), and finds an IP address of a VTEP3. The edge switch 2 performs VXLAN encapsulation for the message. In the VXLAN header, a source IP address and a source MAC address are the IP address and the MAC address of the VTEP2 respectively, and a destination IP address and a destination MAC address are the IP address and the MAC address of the VTEP3 respectively.

After the edge switch 2 performs encapsulation for the message, the format of the message is shown in FIG. 8. The edge switch 2 sends out the processed message.

At block 309, the message is received by VTEP3. The edge switch 3 removes the VXLAN header of the message, searches a local layer-2 MAC forwarding table according to the outer layer destination IP address (i.e. the IP address of service node B) and finds an egress port. The edge switch 3 forwards the message to service node B via the egress port.

At block 310, service node B receives the message and executes the service policy for the message. After the service policy is executed, service node B determines that the service node B is the last service node according to the outer service information layer of the message. Service node B removes the outer service information layer of the message and sends the message to the Fabric network.

At block 311, the message is received by the edge switch 3. The edge switch 3 does not find an entry corresponding to the inner layer destination IP address of the message in a local layer-2 MAC forwarding table, and determines to perform layer-3 forwarding processing. The edge switch 3 searches for a VTEP IP address according to the inner layer destination IP address of the message (i.e. the IP address of the VM5), finds an IP of a VTEP4 (i.e. the edge switch 4), and performs VXLAN encapsulation for the message. In the VXLAN header, a source IP address and a source MAC address are the IP address and the MAC address of the VTEP3 (i.e. the edge switch 3) respectively, and a destination IP address and a destination MAC address are the IP address and the MAC address of the VTEP4 respectively. The edge switch 3 sends out the processed message.

At block 312, the message is received by VTEP4 (i.e. the edge switch 4), the edge switch 4 removes the VXLAN header of the message, searches a local layer-2 MAC forwarding table according to the outer layer destination IP address (i.e. the IP address of the VM5), finds an egress port, and forwards the message to the VM5 via the egress port.

According to the examples of the present disclosure, the VM classification policy and the executing policy corresponding to each VM class are configured on the policy controller and distributed to each edge switch. The edge switch adds the information of the service nodes to be executed by the VM and the executing sequence into the message dynamically. After the VM migrates to a new edge switch, if the VM sends a message, the new edge switch only needs to, according to the above configured information, add the information of the service nodes to be executed by the VM and the executing sequence into the message, so as to implement the automatic migration of the service policy.

In addition, the service node is not limited by locations. The service policy may migrates automatically so that the information of the service nodes and the executing sequence configured on the edge switch do not need to be changed when the VM is migrated.

Further, each edge switch is configured as the VTEP and the IPGW, so that cross network forwarding of the messages can be implemented. The examples of the present disclosure may be used when the VMs are located at different VLANs, and original service nodes may execute the service policy for the VMs after the VMs are migrated.

Moreover, by configuring the executing sequence of the service nodes, the VM may flexibly implement services of multiple service nodes in order. By adjusting the VM classification policy, the executing sequence of the service nodes corresponding to the VMs are adjusted accordingly.

Figure 9:
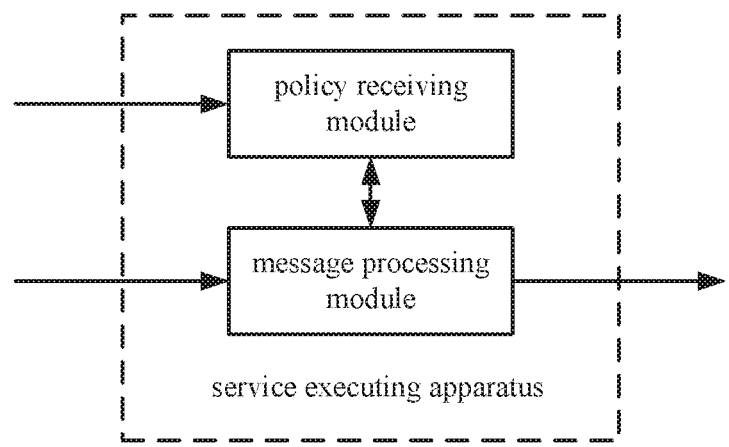
FIG. 9 is a schematic diagram illustrating an apparatus for executing a service according to an example of the present disclosure.

FIG. 9 is a schematic diagram illustrating an apparatus for executing a service according to an example of the present disclosure. The apparatus is located at an edge switch. The apparatus mainly includes a policy receiving module and a message processing module.

The policy receiving module receives and stores a VM classification policy and an executing policy corresponding to each VM class distributed by a policy controller. The executing policy includes information of each service node for processing a message and an executing sequence of the each service node.

The message processing module receives a message sent by a VM connected to the edge switch, determines a VM class corresponding to the message according to the VM classification policy, determines an executing policy corresponding to the VM class, encapsulates the message according to information of each service node to be executed by a VM of the VM class and a executing sequence, and sends the message, so that the message is sequentially sent to the each service node to be executed by the VM of the class to execute a service policy.

In an example, the policy receiving module updates a VM classification policy stored by the edge switch after receiving a updated VM classification policy distributed by the policy controller. In another example, the policy receiving module updates an executing policy corresponding to one VM class stored by the edge switch, after receiving a updated executing policy corresponding to the VM class distributed by the policy controller.

In an example, when the message processing module encapsulates the message according to the information of each service node to be executed by the VM of the VM class and the executing sequence, the following processing is performed by the message processing module.

The message processing module encapsulates information of each service node to be executed by the VM of the VM class and information of each executed service node in an outer service information layer of the message according to the executing sequence, encapsulates an address of a first service node to be executed by the VM of the VM class in an outer layer address header of the message as a destination address of the message.

In an example, a VTEP function and an IPGW function are enabled on the edge switch, and a VTEP IP address, an IPGW IP address and an MAC address are configured for the edge switch. When sending the message, the following processing is performed by the message processing module.

The message processing module does not find an IP address of the first service node to be executed by the VM of the VM class in a local layer-2 MAC forwarding table, encapsulates an outer layer IP header and an outer layer MAC header into the message. In the outer layer IP header, an outer layer source IP address is the VTEP IP address of the edge switch or an IP address of the VM, and an outer layer destination IP address is the IP address of the first service node to be executed by the VM of the VM class. In the outer layer MAC header, an outer layer source MAC address is an arbitrarily MAC address, and an outer layer destination MAC address is the MAC address of the edge switch. The message processing module starts to perform forwarding processing for the message, discovers the outer layer destination MAC address is a gateway MAC address, and determines to perform layer-3 forwarding process. In the layer-3 forwarding processing, the message processing module searches for a VTEP according to the outer layer destination IP address of the message, and performs VXLAN encapsulation for the message according to the found VTEP. In a VXLAN header, a source IP address and a source MAC address are the VTEP IP address and the MAC address of the edge switch respectively, and a destination IP address and a destination MAC address are a found VTEP IP address and a found MAC address respectively. The message processing module sends out the processed message.

Figure 10:
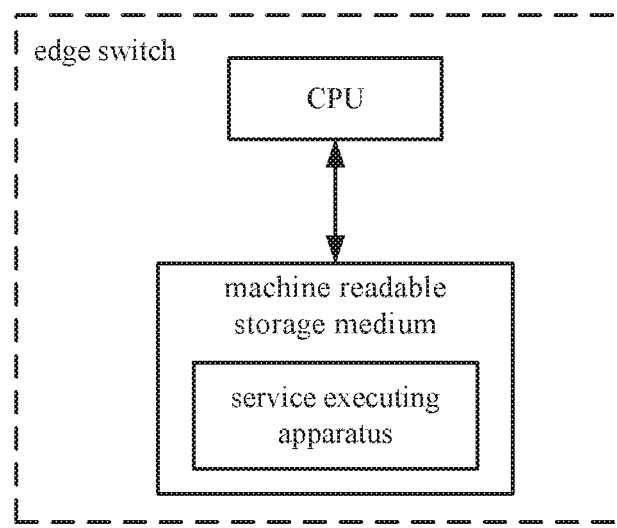
FIG. 10 is a schematic diagram illustrating a hardware structure of an edge switch including an apparatus for executing a service according to an example of the present disclosure.

The edge switch provided by the present disclosure may be a programmable device with software and hardware. The hardware structure of the edge switch may refer to FIG. 10. FIG. 10 is a schematic diagram illustrating a hardware structure of an edge switch including an apparatus for executing a service according to an example of the present disclosure. The edge switch includes a machine readable storage medium, a CPU and other hardware. The machine readable storage medium stores instruction codes, operations implemented when the instruction codes are executed by the CPU mainly are functions implemented by the service executing apparatus.

The CPU communicates with the machine readable storage medium, reads and executes the instruction codes stored in the machine readable storage medium, and implements the functions implemented by the service executing apparatus. The service executing apparatus is implemented via running the computer program instructions stored in the machine readable storage medium by the CPU when the service executing apparatus is taken as a logical apparatus. When computer program instructions are executed, the implemented service executing apparatus is to execute operations corresponding to the method for executing the service described in the above examples.

Figure 11:
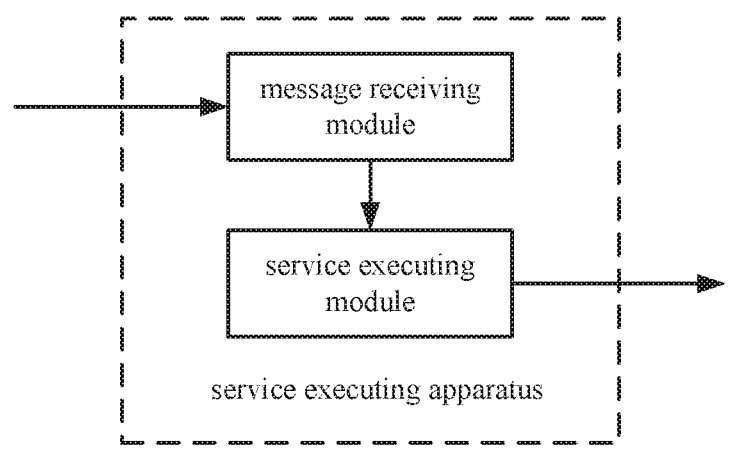
FIG. 11 is a schematic diagram illustrating an apparatus for executing a service according to another example of the present disclosure.

FIG. 11 is a schematic diagram illustrating an apparatus for executing a service according to another example of the present disclosure. The apparatus is located at a service node. The apparatus mainly includes a message receiving module and a service executing module.

The message receiving module receives a message sent by an edge switch and forwards the message to the service executing module. Information of each service node to be executed by a VM of a VM class corresponding to the message and an executing sequence are encapsulated in an outer service information layer of the message.

The service executing module executes a service policy for the message, finds an address of a next service node from the outer service information layer of the message if discovering that the service node is not a last service node after the service policy is executed. The service executing module encapsulates the address of the next service node into the message as an outer layer destination address, and sends out the message.

Figure 12:
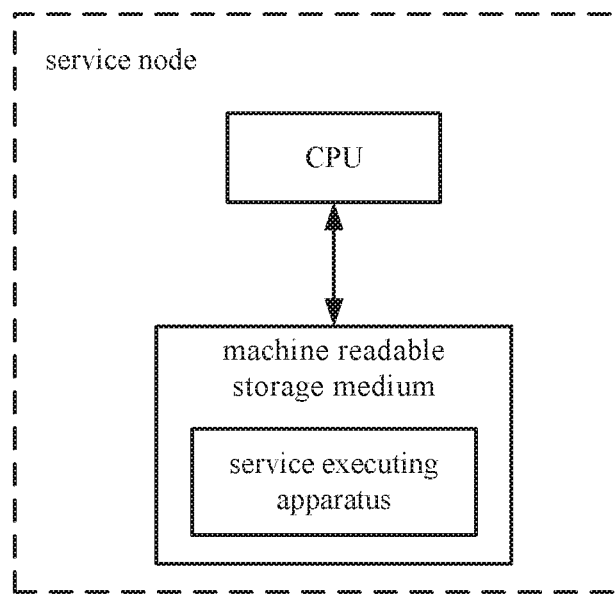
FIG. 12 is a schematic diagram illustrating a hardware structure of a service node including an apparatus for executing a service according to an example of the present disclosure.

In an example, if it is discovered that the service node is the last service node after the service policy is executed, the service executing module removes the outer service information layer of the message, and sends the message to the edge switch of the service node, so that the edge switch sends the message to a destination VM. The service node provided by the present disclosure may be a programmable device with software and hardware. The hardware structure of the service node may refer to FIG. 12. FIG. 12 is a schematic diagram illustrating a hardware structure of a service node including an apparatus for executing a service according to an example of the present disclosure. The service node includes a machine readable storage medium, a CPU and other hardware.

The machine readable storage medium stores instruction codes, operations implemented when the instruction codes are executed by the CPU mainly are functions implemented by the service executing apparatus.

The CPU communicates with the machine readable storage medium, reads and executes the instruction codes stored in the machine readable storage medium, and implements the functions implemented by the service executing apparatus. The service executing apparatus is implemented via running the computer program instructions stored in the machine readable storage medium by the CPU when the service executing apparatus is taken as a logical apparatus. When computer program instructions are executed, the implemented service executing apparatus is to execute operations corresponding to the method for executing the service described in the above examples.

The machine readable storage medium may be any electric, magnetic, optical storage devices or other physical storage devices, and may include or store information, such as executable instructions, data and etc. For example, the machine readable storage medium may be Random Access Memory (RAM), transitory storage, non-transitory storage, flash card, storage drive (such as hard disk drive), solid-state drive, storage disk of any type (such as disc, DVD, etc.), or similar storage medium or any combination of the above.

Any one machine readable storage medium described in the present disclosure may be regarded as non-transitory.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for executing a service, comprising:
   receiving, by an edge switch, a virtual machine (VM) classification policy and an executing policy corresponding to each VM class distributed by a policy controller, the executing policy comprising information of each service node for processing a message and an executing sequence of the each service node, wherein a virtual Extensible LAN (VXLAN) Tunnel End Point (VTEP) function and an Internet Protocol GateWay (IPGW) function are enabled on the edge switch, and a VTEP IP address, an IPGW IP address and an MAC address are configured for the edge switch;
   receiving a message sent by a VM connected to the edge switch;
   determining a VM class corresponding to the message according to the VM classification policy, and determining an executing policy corresponding to the VM class;
   encapsulating the message according to information of each service node to be executed by a VM of the VM class and an executing sequence, and sending the message, so that the message is sequentially sent to the each service node to be executed by the VM of the VM class to execute a service policy;
   wherein, sending the message comprises:
   if the edge switch does not find an IP address of the first service node to be executed by the VM of the VM class in a local layer-2 MAC forwarding table, encapsulating, by the edge switch, an outer layer IP header and an outer layer MAC header into the message; in the outer layer IP header, an outer layer source IP address being the VTEP IP address of the edge switch or an IP address of the VM, and an outer layer destination IP address being the IP address of the first service node to be executed by the VM of the VM class; in the outer layer MAC header, an outer layer destination MAC address being the MAC address of the edge switch;

starting, by the edge switch, to perform forwarding processing for the message; discovering that the outer layer destination MAC address is a gateway MAC address; and determining to perform layer-3 forwarding processing; wherein the layer-3 forwarding processing comprises: searching, by the edge switch, for a VTEP according to the outer layer destination IP address of the message, and performing VXLAN encapsulation for the message according to the found VTEP; in a VXLAN header, a source IP address and a source MAC address being the VTEP IP address and the MAC address of the edge switch respectively, and a destination IP address and a destination MAC address being a found VTEP IP address and a found MAC address respectively; sending out the message.

2. The method of claim 1, further comprising:

updating, by the edge switch, a VM classification policy stored by the edge switch, after receiving a updated VM classification policy distributed by the policy controller; or updating, by the edge switch, an executing policy corresponding to one VM class stored by the edge switch, after receiving a updated executing policy corresponding to the VM class distributed by the policy controller.

3. The method of claim 1, wherein encapsulating the message according to the information of each service node to be executed by the VM of the VM class and an executing sequence comprises:

encapsulating information of each service node to be executed by the VM of the VM class and information of each executed service node in an outer service information layer of the message according to the executing sequence;

encapsulating an address of a first service node to be executed by the VM of the VM class in an outer layer address header of the message as a destination address of the message.

4. An apparatus for executing a service, located at an edge switch, comprising:

a policy receiving module, to receive a VM classification policy and an executing policy corresponding to each VM class distributed by a policy controller; the executing policy comprising information of each service node for processing a message and an executing sequence of the each service node, wherein a virtual Extensible LAN (VXLAN) Tunnel End Point (VTEP) function and an Internet Protocol GateWay (IPGW) function are enabled on the edge switch, and a VTEP IP address, an IPGW IP address and an MAC address are configured for the edge switch;

a message processing module, to receive a message sent by a VM connected to the edge switch, determine a VM class corresponding to the message according to the VM classification policy, determine an executing policy corresponding to the VM class, encapsulate the message according to information of each service node to be executed by a VM of the VM class and an executing sequence, and sending the message, so that the message is sequentially sent to the each service node to be executed by the VM of the class to execute a service policy; and when sending the message, the message processing module is to, encapsulate an outer layer IP header and an outer layer MAC header into the message if the message processing module does not find an IP address of the first service node to be executed by the VM of the VM class in a local layer-2 MAC forwarding table; in the outer layer IP header, an outer layer source IP address being the VTEP IP address of the edge switch or an IP address of the VM, and an outer layer destination IP address being the IP address of the first service node to be executed by the VM of the VM class; in the outer layer MAC header, an outer layer destination MAC address being the MAC address of the edge switch;

start to perform forwarding processing for the message, discover that the outer layer destination MAC address is a gateway MAC address, and determine to perform layer-3 forwarding processing; in the layer-3 forwarding processing, the message processing module is to search for a VTEP according to the outer layer destination IP address of the message, and perform VXLAN encapsulation for the message according to the found VTEP; in a VXLAN header, a source IP address and a source MAC address being the VTEP IP address and the MAC address of the edge switch respectively, and a destination IP address and a destination MAC address being a found VTEP IP address and a found MAC address respectively; send the message.

5. The apparatus of claim 4, wherein the policy receiving module is further to, update a VM classification policy stored by the edge switch after receiving a updated VM classification policy distributed by the policy controller; or update an executing policy corresponding to one VM class stored by the edge switch, after receiving a updated executing policy corresponding to the VM class distributed by the policy controller.

6. The apparatus of claim 4, wherein when the message processing module encapsulates the message according to the information of each service node to be executed by the VM of the VM class and the executing sequence, the message processing module is to encapsulate information of each service node to be executed by the VM of the VM class and information of each executed service node in an outer service information layer of the message according to the executing sequence, encapsulate an address of a first service node to be executed by the VM of the VM class into an outer layer address header of the message as a destination address of the message.

* * * * *